(12) United States Patent
Wilkinson

(10) Patent No.: US 9,158,950 B2
(45) Date of Patent: Oct. 13, 2015

(54) METHOD AND APPARATUS PERTAINING TO USE OF MULTIPLE SESSIONS WITH RFID TAGS

(71) Applicant: Wal-Mart Stores, Inc., Bentonville, AR (US)

(72) Inventor: Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 307 days.

(21) Appl. No.: 13/804,970

(22) Filed: Mar. 14, 2013

(65) Prior Publication Data

US 2014/0266617 A1    Sep. 18, 2014

(51) Int. Cl.
| G06K 7/10 | (2006.01) |
| G06K 7/00 | (2006.01) |
| G06Q 10/08 | (2012.01) |
| G08B 13/24 | (2006.01) |

(52) U.S. Cl.
CPC .......... *G06K 7/10475* (2013.01); *G06K 7/0008* (2013.01); *G06Q 10/087* (2013.01); *G08B 13/2417* (2013.01); *G08B 13/2448* (2013.01)

(58) Field of Classification Search
CPC ............. G06K 7/10475; G06K 7/0008; G08B 13/2417; G08B 13/2448; G06Q 10/087
See application file for complete search history.

(56) References Cited

U.S. PATENT DOCUMENTS

| 4,303,910 A | 12/1981 | McCann |
| 4,595,915 A | 6/1986 | Close |
| 4,888,579 A | 12/1989 | ReMine |
| 5,055,659 A | 10/1991 | Hendrick |
| 5,119,104 A | 6/1992 | Heller |
| 5,737,193 A | 4/1998 | LaRiviere |
| 6,046,683 A | 4/2000 | Pidwerbetsky |
| 6,204,765 B1 | 3/2001 | Brady |
| 6,662,068 B1 | 12/2003 | Ghaffari |
| 6,804,578 B1 | 10/2004 | Ghaffari |
| 6,903,656 B1 | 6/2005 | Lee |
| 7,232,069 B1 * | 6/2007 | White .......................... 235/451 |
| 7,245,220 B2 | 7/2007 | Haller |

(Continued)

FOREIGN PATENT DOCUMENTS

| WO | 9700503 | 1/1997 |
| WO | 0014694 | 3/2000 |

OTHER PUBLICATIONS

U.S. Appl. No. 13/803,690, filed Mar. 14, 2013, Wilkinson.

(Continued)

*Primary Examiner* — Benjamin C Lee
*Assistant Examiner* — Rajsheed Black-Childress
(74) *Attorney, Agent, or Firm* — Fitch Even Tabin & Flannery LLP

(57) ABSTRACT

At a facility having a first area and a second area that is at least substantially non-overlapping with the first area, these teachings provide for using at least a first RFID-tag reader to read RFID tags in a first inventory state in the first area using a first session protocol while also contemporaneously using a second session protocol to cause the RFID-tag reader to cause RFID tags in the first area to switch to that first inventory state. In a similar manner these teachings also provide for using a second RFID-tag reader to read RFID tags in the first inventory state in the second area using the second session protocol while also contemporaneously using the first session protocol to cause RFID tags in the second area to switch to the first inventory state.

15 Claims, 3 Drawing Sheets

(56) References Cited

U.S. PATENT DOCUMENTS

| | | | |
|---|---|---|---|
| 7,667,602 | B2 | 2/2010 | Ulrich |
| 7,952,480 | B1 | 5/2011 | Kuzma |
| 8,669,915 | B2 | 3/2014 | Wilkinson |
| 2005/0040232 | A1 | 2/2005 | Maloney |
| 2005/0076816 | A1 | 4/2005 | Nakano |
| 2005/0168385 | A1 | 8/2005 | Baker |
| 2005/0278062 | A1 | 12/2005 | Janert |
| 2007/0008071 | A1 | 1/2007 | Hansen |
| 2007/0135961 | A1 | 6/2007 | Ishida |
| 2007/0200701 | A1 | 8/2007 | English |
| 2007/0222606 | A1 | 9/2007 | Phipps |
| 2008/0174432 | A1 | 7/2008 | Ulrich |
| 2009/0280741 | A2 | 11/2009 | Krinsky |
| 2009/0309704 | A1 | 12/2009 | Chang |
| 2010/0164710 | A1 | 7/2010 | Chung |
| 2010/0172502 | A1 | 7/2010 | Jones |
| 2011/0249831 | A1 | 10/2011 | Bellamy |
| 2012/0086553 | A1 | 4/2012 | Wilkinson |

OTHER PUBLICATIONS

EPCGLOBAL; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

Lindsay et al.; Retail RFID Systems without Smart Shelves; published at http://www.jefflindsay.com/rfid1.shtml; 9 pages; Nov. 7, 2003.

NAVSUP; Naval Supply Systems Command, Final Report of the Passive Radio-Frequency Identification (RFID) Project at the Fleet and Industrial Supply Center, Norfolk, Virginia, Ocean Terminal; 31 pages, Oct. 20, 2004.

PCT; App. No. PCT/US2008/051378; International Search Report mailed Oct. 7, 2008; 3 pgs.

PCT; App. No. PCT/US2014/025950; International Search Report mailed Jul. 24, 2014.

PCT; App. No. PCT/US2014/025950; Written Opinion mailed Jul. 24, 2014.

* cited by examiner

METHOD AND APPARATUS PERTAINING TO USE OF MULTIPLE SESSIONS WITH RFID TAGS

TECHNICAL FIELD

This invention relates generally to radio-frequency identification (RFID)-tag reader systems.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item correlated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Each EPC-compliant tag has two states: "A" and "B." The "A" state comprises the default state and hence represents the tag's state when initially powering up. Once a tag has been read its state changes from "A" to "B." During the "A" state a tag will respond to any reader that offers a session query. During the "B" state the tag will not again respond to a reader using the same session query.

The EPC approach also supports four session protocols that differ with respect to how a read tag persists a "B" state. In Session "0" a read tag will persist this "B" state until power is lost and then the tag reverts immediately to the "A" state. In Session "1" a read tag will persist its "B" state for a period of time ranging from 500 ms to 5 seconds and will then automatically revert to the "A" state. In Session "2" and "3" a read tag will remain in the "B" state until power is lost. Then, once power is lost, the read tag will persist its "B" state for at least an additional 2 seconds (the actual persistence duration is left to the manufacturer and can reach minutes in some cases). In many cases a system designer will choose a particular EPC session protocol and employ that session protocol throughout a given facility.

In some cases a system designer will seek to provide more-or-less ubiquitous coverage through a given facility (such as a retail store) and thereby have the theoretical ability to read an RFID tag regardless of where that tag might be located within the facility. There are numerous (and significant) challenges, unfortunately, to designing and deploying such a system. On the one hand, continuously prompting all RFID tags to constantly (or even frequently) assume an A inventory state will typically result in those RFID tags constantly being read. When the facility includes a large number of RFID tags such a situation can result in an overwhelming number of reads that can literally prevent the system from providing useful data to the system user. On the other hand, leaving read RFID tags in the B inventory state regardless of circumstance can leave the system blind to important in-facility events as pertain to those RFID tags.

BRIEF DESCRIPTION OF THE DRAWINGS

The above needs are at least partially met through provision of the method and apparatus pertaining to use of multiple sessions with RFID tags described in the following detailed description, particularly when studied in conjunction with the drawings, wherein.

Figure 1:
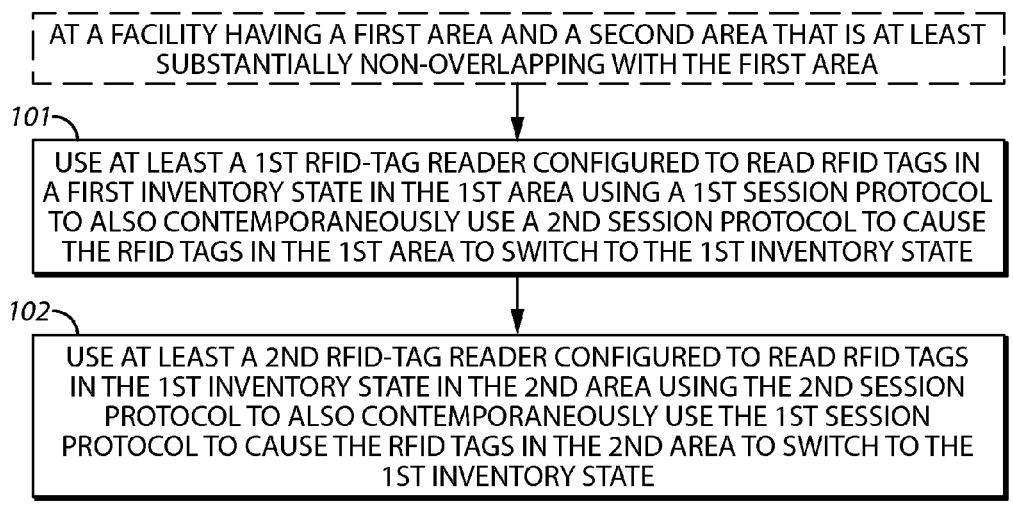
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments set forth approaches to interacting with RFID tags at a facility having a first area and a second area that is at least substantially non-overlapping with the first area. These teachings provide for using at least a first RFID-tag reader to read RFID tags in a first inventory state in the first area using a first session protocol while also contemporaneously using a second session protocol to cause the RFID-tag reader to cause RFID tags in the first area to switch to that first inventory state. In a similar manner these teachings also provide for using a second RFID-tag reader to read RFID tags in the first inventory state in the second area using the second session protocol while also contemporaneously using the first session protocol to cause RFID tags in the second area to switch to the first inventory state.

By way of an illustrative example the aforementioned first area can comprise a non-public inventory-storage area of a retail establishment and the second area can comprise a public sales area where retail commodities are displayed and made available for purchase. By one approach the present teachings can be employed to generally use a first session protocol when reading RFID tags in the inventory-storage area and a second, different session protocol when reading RFID tags in the public sales area. Such an approach can serve, for example, to read RFID tags upon first entering one of these areas.

Furthermore, by one approach the present teachings will help to ensure that RFID tags remain in a readable state so that such RFID tags are actually read upon so entering such an area. For example, in addition to permitting RFID tags in, for example, the inventory-storage area to be read these teachings will also serve to maintain such RFID tags in an inventory state for the session protocol employed in the public sales area that will tend to help ensure that such RFID tags are read upon moving from the inventory-storage area to the public sales area.

Figure 2:
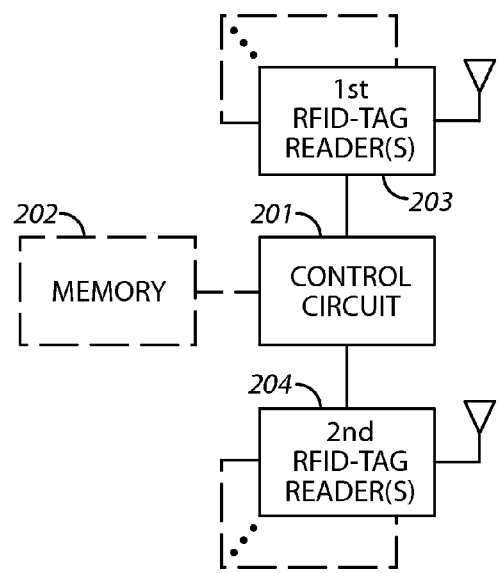
FIG. 2 comprises a block diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented. For the sake of an illustrative example, but without intending to suggest any specific limitations in these regards, it will be presumed in this description that this process 100 is carried out at a facility having a first area and a second area that is at least substantially non-overlapping with the first area. Referring momentarily to FIG. 2, it will be similarly presumed that this facility 200 includes a control circuit 201 (that may, or may not, operably couple to an optional memory 202 as desired) that operably couples to one or more first RFID-tag readers 203 and also to one or more second RFID-tag readers 204.

Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

By one approach, one or more of the aforementioned RFID-tag readers 203 and 204 may comprise overhead RFID-tag readers that hang suspended from the ceiling of the facility 200. Examples in such regards can be found, for example, in U.S. patent application Ser. No. 12/900,191, entitled METHOD AND APPARATUS PERTAINING TO RFID TAG READER ANTENNA ARRAY, the contents of which are fully incorporated herein by this reference.

It is presumed for the sake of an illustrative example that the aforementioned first RFID-tag reader(s) 203 is physically disposed within the aforementioned first area and the second RFID-tag reader(s) 204 is physically disposed within the aforementioned second area in order for the primary (or exclusive) reading coverage area of each reader to be similarly contained. Accordingly, the primary reading coverage zone for the first RFID-tag reader(s) 203 is within the first area while the primary reading coverage zone for the second RFID-tag reader(s) 204 is within the second area. That said, in a typical application setting it will not be unusual or unexpected for the coverage zone of one of the first RFID-tag readers 203 to partially overlap, at least from time to time, with the second area and/or for the coverage zone of one of the second RFID-tag readers 204 to partially overlap with the first area.

Figure 3:
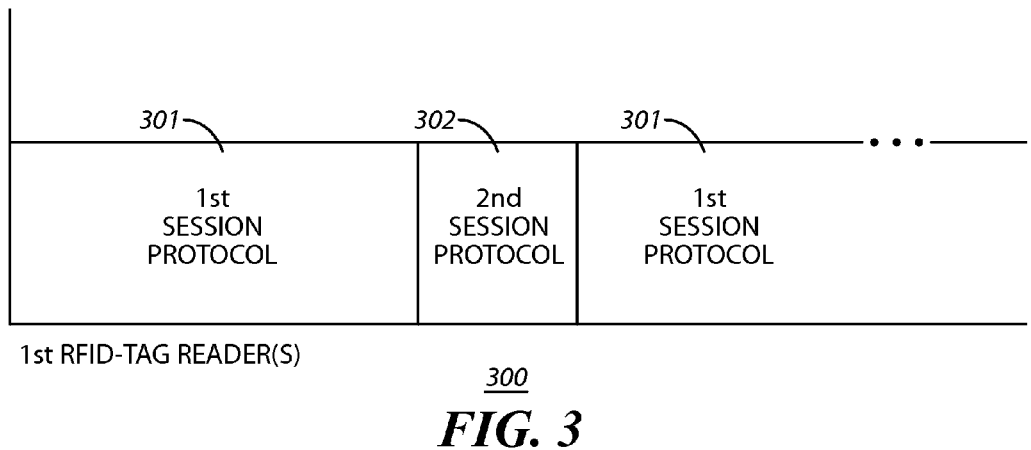
FIG. 3 comprises a timing diagram as configured in accordance with various embodiments of the invention.

Referring now to FIGS. 1, 2, and 3, at 101 the process 100 provides for using the aforementioned one or more first RFID-tag readers 203 to read RFID tags in a first inventory state (such as, for example, the EPC "A" inventory state) in the first area using a first session protocol 301 (such as, for example, the EPC's session "1"). Contemporaneously, one or more of these first RFID-tag readers 203 also uses a second session protocol 302 (such as, for example, the EPC's session "2") to cause RFID tags in the first area to switch to the aforementioned first inventory state. (As used herein this reference to a "second" session protocol will be understood to refer to a session protocol that is different from the aforementioned first session protocol.) Those skilled in the art will understand that the EPC standard includes such a capability.

As used herein, the word "contemporaneously" will be understood to include activities/events that are wholly or partially coincident in time, activities/events that are temporally concatenated (immediately or at least close in time— say, within a few seconds), and activities/events that are neither juxtaposed in time or even merely offset in time from one another but that are separated in time by other activities/ events that do not represent a majority of the RFID-tag reader's operations over some significant period of time such as, for example, one or two hours. Accordingly, while FIG. 3 presents the two session protocols 301 and 302 as being temporally concatenated, it will be understood that these teachings are intended to have broader applicability in these regards.

Figure 4:
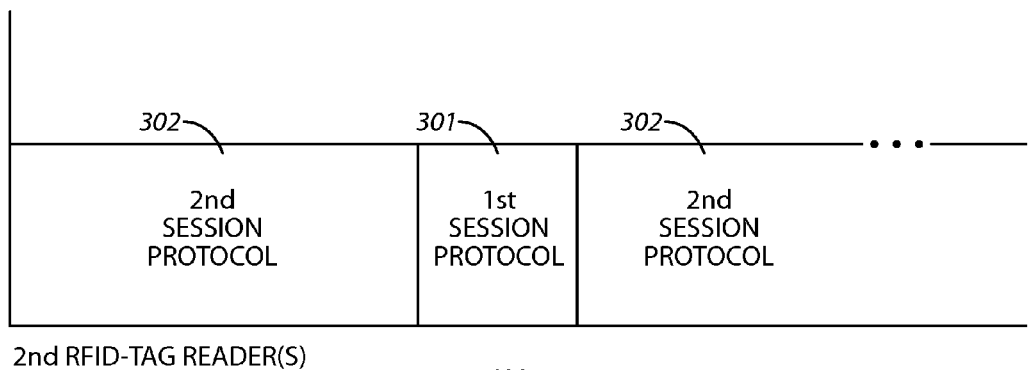
FIG. 4 comprises a timing diagram as configured in accordance with various embodiments of the invention.

Referring now to FIGS. 1, 2, and 4, at 102 the process 100 provides for using the aforementioned one or more second RFID-tag readers 204 to read RFID tags in a first inventory state (such as, for example, the EPC "A" inventory state) in the second area using the second session protocol 302. Contemporaneously, one or more of these second RFID-tag readers 204 also uses the first session protocol 301 to cause RFID tags in the second area to switch to the aforementioned first inventory state.

So configured, the RFID-tag readers for a first area of a given facility are configured to read RFID tags using a first session protocol while the RFID-tag readers for a second, different area of that facility are configured to read RFID tags using a second, different session protocol. In addition, those RFID-tag readers also, from time to time, cause the RFID tags within their coverage area to switch their inventory states (if a switch is necessary) to the "A" inventory state for the session protocol that corresponds to the RFID-tag readers for other than their coverage area.

The periodicity by which such RFID-tag readers instruct RFID tags to switch to the "A" inventory state can vary as desired. By one approach the periodicity can be regular and even predictable. By another approach the periodicity can be irregular and even unscheduled at least to some extent. In many application settings it may be useful and sufficient to only provide that switching instruction at least once (and/or no more often than) every one second, two seconds, five seconds, or even ten seconds (with even longer durations being possibly appropriate in some application settings).

Figure 5:
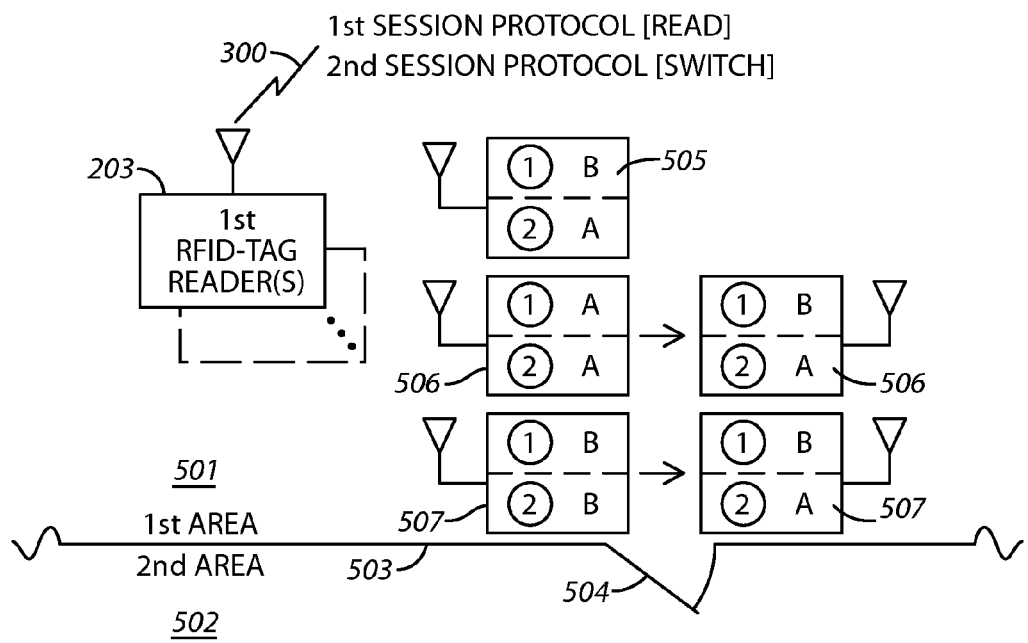
FIG. 5 comprises a schematic representation as configured in accordance with various embodiments of the invention.
Figure 5:
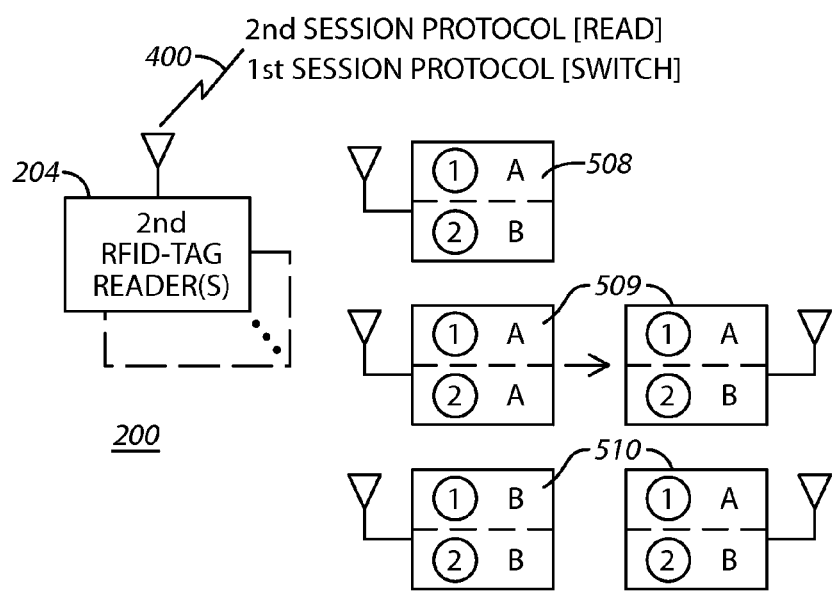

FIG. 5 presents a more specific working example in these regards. It will again be understood that the specifics of this example are not intended to be exhaustive in these regards and are certainly not intended to suggest any particular limitations by way of such specificity.

In this example the facility 200 comprises a retail establishment having a first area 501 that comprises a non-public backroom storage area and a second area 502 that comprises a public sales floor where various commodities are displayed and available for purchase by members of the public. A wall 503 serves, at least in part, to separate these two areas 501 and 502 with at least one door 504 serving to provide a pathway from one area to the other by authorized associates. Such arrangements are very well known in the art and require no further explanation here aside from noting that the wall 503 and/or door 504 may, or may not, be comprised (in whole or in part) of materials that block or at least attenuate radio-frequency carriers.

The aforementioned first RFID-tag readers 203 are situated to at least primarily (and possibly even exclusively) provide RFID-tag reader coverage in the first area 501. In turn, the aforementioned second RFID-tag readers 204 are situated to at least primarily (and possibly even exclusively) provide RFID-tag reader coverage in the second area 502. Those first RFID-tag readers 203 are transmitting/reading using the first RFID-tag reader scheme 300 described above with respect to FIG. 3 while the second RFID-tag readers 204 are transmitting/reading using the second RFID-tag reader scheme 400 described above with respect to FIG. 4.

In the first area 501:

A first RFID tag 505 has a "B" inventory state with respect to the first session protocol and an "A" inventory state with respect to the second session protocol. Accordingly, this RFID tag 505 will remain quiescent and take no particular action with respect to the transmissions of the first RFID-tag readers 203. This is because its "B" inventory state permits the RFID tag 505 to remain quiescent in response to read inquiries per the first session protocol and its "A" inventory state with respect to the second session protocol does not require an switching per the occasional instructions from the first RFID-tag readers 203.

A second RFID tag 506 has an "A" inventory state with respect to both the first session protocol and the second session protocol. In this case, the RFID tag 506 will respond to a read inquiry from the first RFID-tag readers 203 per the first session protocol in which case the inventory state for the first session protocol will switch from the "A" inventory state to the "B" inventory state. This RFID tag 506 will not otherwise respond to the switching instructions from the first RFID-tag readers 203, however, because its inventory state for the second session protocol is already the "A" inventory state.

And a third RFID tag 507 has a "B" inventory state with respect to both the first and second session protocols. In this case the RFID tag 507 will not be read by the first RFID-tag readers 203 per the first session protocol due to that "B" inventory state. This RFID tag 507 will, however, switch from the "B" inventory state for the second session protocol to the "A" inventory state for the second session protocol per the above description.

RFID tag behavior in the second area 502 more or less mirrors the above-described behavior. In particular, in the second area:

A first RFID tag 508 has an "A" inventory state with respect to the first session protocol and a "B" inventory state with respect to the second session protocol. Accordingly, this RFID tag 508 will remain quiescent and take no particular action with respect to the transmissions of the second RFID-tag readers 204. This is because its second session protocol "B" inventory state permits the RFID tag 508 to remain quiescent in response to read inquiries per the second session protocol and its "A" inventory state with respect to the first session protocol does not require any switching per the occasional instructions from the second RFID-tag readers 204 as described above.

A second RFID tag 509 has an "A" inventory state with respect to both the first session protocol and the second session protocol. In this case, the RFID tag 509 will respond to a read inquiry from the second RFID-tag readers 204 per the second session protocol in which case the inventory state for the second session protocol will switch from the "A" inventory state to the "B" inventory state. This RFID tag 509 will not otherwise respond to the switching instructions from the second RFID-tag readers 204, however, because its inventory state for the first session protocol is already the "A" inventory state.

And a third RFID tag 510 has a "B" inventory state with respect to both the first and second session protocols. In this case the RFID tag 510 will not be read by the second RFID-tag readers 204 per the second session protocol due to that "B" inventory state. This RFID tag 510 will, however, switch from the "B" inventory state for the first session protocol to the "A" inventory state for the first session protocol per the above description.

Accordingly, it will be appreciated that RFID tags that move from one area to the other will be read upon entering the coverage area of the respective RFID-tag reader(s) for the entered area. So, for example, when an associate brings an item having a correspond RFID tag from the back room to the main sales floor the readers for the main sales floor will likely be able to quickly note the introduction of that RFID tag/item to the main sales floor. Similarly, if and when an associate removes an item/tag from the main sales floor and returns the item/tag to the back room, the readers for the back room will likely be able to quickly note this transition. The foregoing benefits accrue, at least in part, due to the ability of the described approach to maintain RFID tags in a state such that the RFID tags are each primed and ready to respond to the RFID-tag readers of a different area by being read.

In a real-world application setting it is also possible for the coverage areas of these different RFID-tag readers for different areas partially overlap, either on a continuous basis or from time to time. For example, when opening the door 504 it is possible that some first area RFID tags might be read by second area RFID-tag readers because the transmissions of the second RFID-tag readers 204 might be momentarily sufficient to accomplish that result. When such a thing happens, of course, the read RFID tag will switch its inventory state from "A" to "B" for the corresponding session protocol. As a result, without further attention, that already-read RFID tag will not be read when as associate actually does move that RFID tag from the first area 501 to the second area 502.

The above-described teachings, however, will permit the first RFID-tag readers 203 for the first area 501 to automatically reset such an RFID tag to the "A" inventory state for the session protocol that serves the second area 502. Accordingly, the system will be able to detect when that RFID tag does eventually move from the first area 501 to the second area 502 because the inventory state for that RFID tag will have been switched back to the "A" inventory state for the second session protocol.

So configured, these teachings can serve well in conjunction with an overall strategy of maintaining most RFID tags in a given facility in a quiescent state for most of the time and generally seeking to prompt a read response only (to whatever extent that can be possible) as important events occur (such as moving from one area of a facility having a first purpose (such as storage) to another area of that facility have a second, different purpose (such as display and sales)).

These teachings are highly flexible in practice and will accommodate a great variety of alterations and embellishments. Various session protocols per the EPC standard can be employed for example, as can other session protocols for other approaches to reading RFID tags. As another example, these teachings will readily accommodate essentially reversing the above-described handling of inventory states (as the EPC standard allows for reading tags in the B inventory state and then causing the read tag to transition to the A inventory state) if desired. And as yet another example in these regards, when one of the aforementioned areas has more than one RFID-tag reader, these teachings do not require that each and every RFID-tag reader in a given such area behave as described herein. Instead, if desired, only those RFID-tag readers that are located near a portal that connects the area in question to a different area might be so configured.

These teachings are also readily scaled to accommodate, for example, three or more circumscribed areas that each have a corresponding unique (within the facility) session protocol if desired. Accordingly, and by way of an illustrative example, a first area could comprise a loading dock receiving area, a second area could comprise a backroom storage area, a third area could comprise a retail showroom, and a fourth area could comprise a garden supplies area.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

I claim:

1. A method of interacting with radio-frequency identification (RFID) tags at a facility having a first area and a second area that is at least substantially non-overlapping with the first area, the method comprising:
using at least a first RFID-tag reader configured to read RFID tags in a first inventory state in the first area using a first session protocol while also contemporaneously using a second session protocol to cause the RFID tags in the first area to switch to the first inventory state with respect to the second session protocol;
using at least a second RFID-tag reader configured to read RFID tags in the first inventory state in the second area using the second session protocol while also contemporaneously using the first session protocol to cause the RFID tags in the second area to switch to the first inventory state with respect to the first session protocol.

2. The method of claim 1 wherein the first area comprises a public area of the facility and the second area comprises a non-public area of the facility.

3. The method of claim 2 wherein the facility comprises a retail-sales facility.

4. The method of claim 1 wherein the first session protocol comprises session 2 as specified by a standard denoted as EPC Radio-Frequency Identity Protocols Class-1 Generation-2 UHF RFID Protocol for Communications at 860 MHz-960 MHz Version 1.0.9 (standard) and the second session protocol comprises session 3 as specified by the standard.

5. The method of claim 4 wherein the first inventory state comprises inventory state A and a second inventory state comprises inventory state B, both as specified by the standard.

6. A method of interacting with radio-frequency identification (RFID) tags at a facility having a first area and a second area that is at least substantially non-overlapping with the first area, the method comprising:
using a first plurality of RFID-tag readers that are each configured to read RFID tags in a first inventory state in the first area using a first session protocol while also contemporaneously using a second session protocol to cause the RFID tags in the first area to switch to the first inventory state with respect to the second session protocol;
using a second plurality of RFID-tag readers that are each configured to read RFID tags in the first inventory state in the second area using the second session protocol while also contemporaneously using the first session protocol to cause the RFID tags in the second area to switch to the first inventory state with respect to the first session protocol.

7. The method of claim 6 wherein the first area comprises a public area of the facility and the second area comprises a non-public area of the facility.

8. The method of claim 7 wherein the facility comprises a retail-sales facility.

9. The method of claim 6 wherein the first session protocol comprises session 2 as specified by a standard denoted as EPC Radio-Frequency Identity Protocols Class-1 Generation-2 UHF RFID Protocol for Communications at 860 MHz-960 MHz Version 1.0.9 (standard) and the second session protocol comprises session 3 as specified by the standard.

10. The method of claim 9 wherein the first inventory state comprises inventory state A and a second inventory state comprises inventory state B, both as specified by the standard.

11. An apparatus comprising:
a facility having a first area and a second area that is at least substantially non-overlapping with the first area;
at least a first RFID-tag reader configured to read RFID tags in a first inventory state in the first area using a first session protocol and that is also configured to contemporaneously use a second session protocol to cause the RFID tags in the first area to switch to the first inventory state with respect to the second session protocol;
at least a second RFID-tag reader configured to read RFID tags in the first inventory state in the second area using the second session protocol and that is also configured to contemporaneously use the first session protocol to cause the RFID tags in the second area to switch to the first inventory state with respect to the first session protocol.

12. The apparatus of claim 11 wherein the first area comprises a public area of the facility and the second area comprises a non-public area of the facility.

13. The apparatus of claim 12 wherein the facility comprises a retail-sales facility.

14. The apparatus of claim 11 wherein the first session protocol comprises session 2 as specified by a standard denoted as EPC Radio-Frequency Identity Protocols Class-1 Generation-2 UHF RFID Protocol for Communications at 860 MHz-960 MHz Version 1.0.9 (standard) and the second session protocol comprises session 3 as specified by the standard.

15. The apparatus of claim 14 wherein the first inventory state comprises inventory state A and a second inventory state comprises inventory state B, both as specified by the standard.

\* \* \* \* \*